United States Patent [19]

Wilder et al.

[11] Patent Number: 4,665,393

[45] Date of Patent: May 12, 1987

[54] VIBRATION MONITORING SYSTEM AND APPARATUS

[76] Inventors: Peggy L. Wilder; Robert G. Wilder, both of Box 1057, West Columbia, Tex. 77486

[21] Appl. No.: 612,692

[22] Filed: May 21, 1984

[51] Int. Cl.$^4$ ............................................. G08B 21/00
[52] U.S. Cl. ..................................... 340/683; 340/682
[58] Field of Search ............... 340/682, 683, 679, 686; 73/660, 661, 649

[56] References Cited

U.S. PATENT DOCUMENTS

| | | | |
|---|---|---|---|
| 2,764,020 | 9/1956 | Gadd | 73/661 |
| 3,201,776 | 8/1965 | Morrow et al. | 340/683 |
| 3,735,377 | 5/1973 | Kaufman | 340/679 X |
| 3,763,397 | 10/1973 | Yockers | 340/679 X |
| 3,835,696 | 9/1974 | Amberger et al. | 73/649 |
| 3,938,128 | 2/1976 | Pidsosny et al. | 340/679 X |
| 3,979,739 | 9/1976 | Birchall | 73/660 X |
| 4,016,752 | 4/1977 | Carey | 73/660 X |
| 4,326,677 | 4/1982 | Schippers et al. | 340/682 X |
| 4,379,291 | 4/1983 | Hubbard et al. | 340/682 |
| 4,502,046 | 2/1985 | Wonn et al. | 340/682 |

FOREIGN PATENT DOCUMENTS 2085164  4/1982  United Kingdom ................. 340/683

Primary Examiner—James L. Rowland
Assistant Examiner—Brian R. Tumm
Attorney, Agent, or Firm—Neal J. Mosely

[57] ABSTRACT

An improved vibration monitoring system and apparatus are disclosed for monitoring rotating shafts, as in motors, pumps, blowers, generators, etc., and signaling the occurrence of an unsafe condition. The apparatus includes a vibration monitoring probe assembly of improved design which is mounted adjacent to a rotating shaft and to the method of attachment thereon. The probe assembly is supported on the fixed housing of the rotating shaft in insulated relation thereto and includes a probe element in spaced relation to the shaft for contact therewith upon occurrence of excessive vibration. A signal conditioner mounted near the probe assembly provides power to the probe and processes the signal and transmits it to the monitor. A remote monitor is provided which indicates excessive vibration in response to a signal from the probe. An electronic circuit is provided which detects and registers the excessive vibration on the monitor through a visual and audible alarm. The system also includes circuits for shutting down the rotating shaft upon occurrence of excessive vibration. A single monitor may register signals from several different probe assemblies and signal conditioners.

19 Claims, 14 Drawing Figures

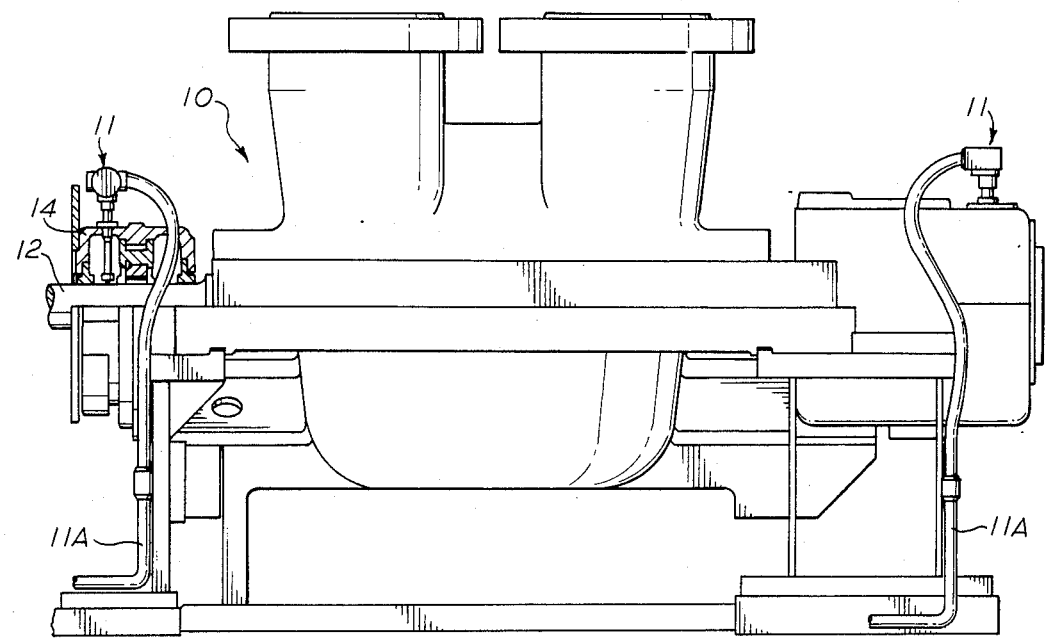
fig.1
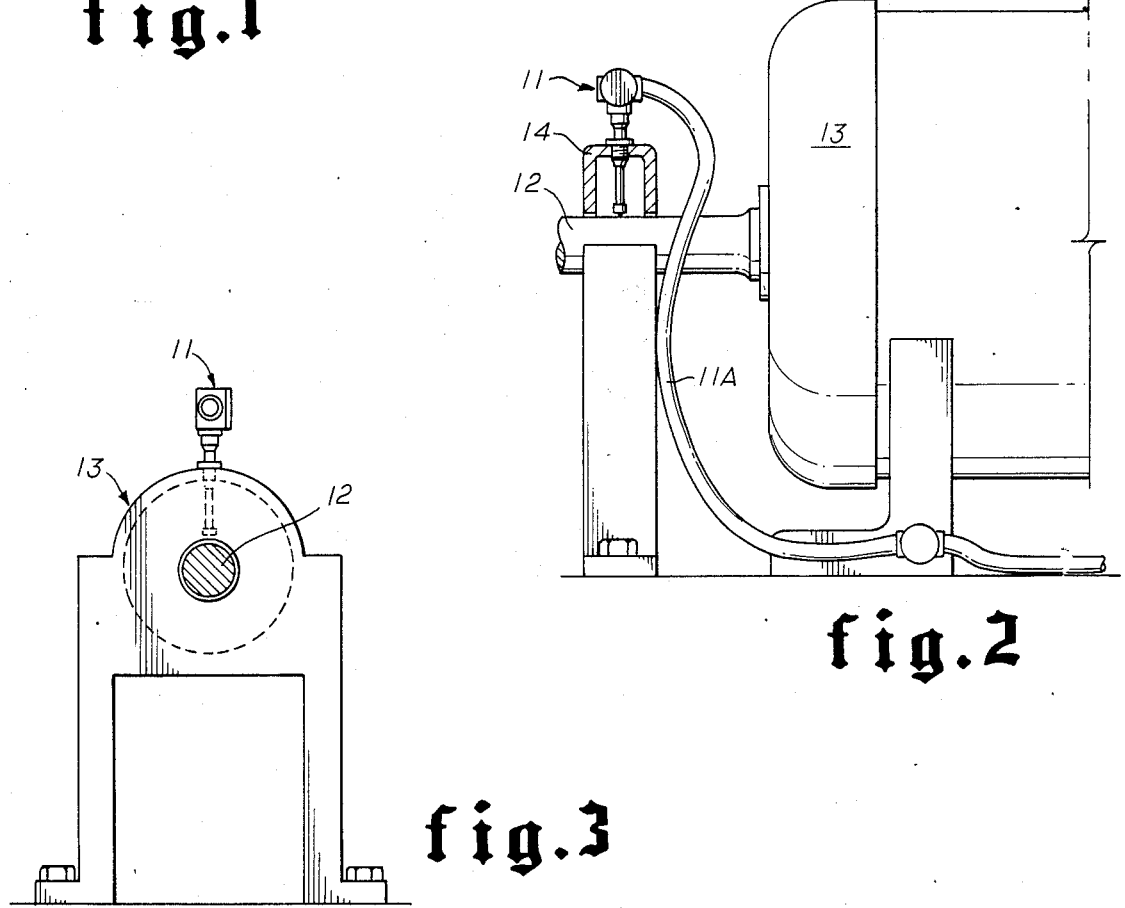
fig.2
fig.3

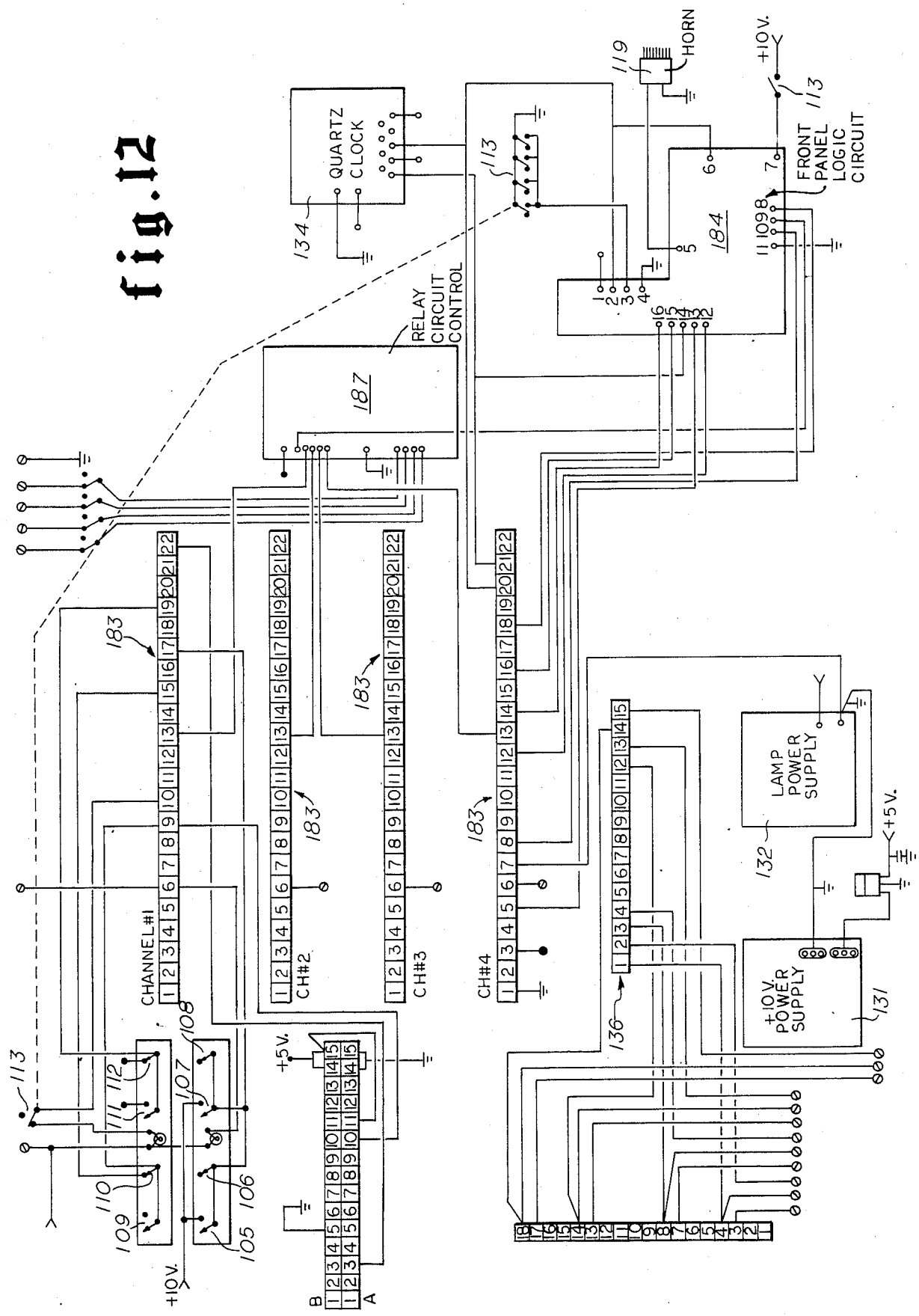

VIBRATION MONITORING SYSTEM AND APPARATUS

BACKGROUND OF THE INVENTION

1. Field of the Invention

This invention relates to new and improves methods and apparatus for monitoring and registering excessive vibration by a rotating shaft.

2. Brief Description of the Prior Art

Dega U.S. Pat. No. 3,034,043 discloses an electrical instrument for testing the movement of resilient seals normally employed with rotating shafts.

Shapiro U.S. Pat. No. 3,058,339 discloses a vibration detector and electric circuit associated therewith for measuring vibration of aircraft turbine engines.

Yockers U.S. Pat. No. 3,763,397 discloses an apparatus and electric circuit for monitoring and shutting down machinery in response to vibration.

Campbell U.S. Pat. No. 3,776,027 discloses a mounting structure for a vibration detecting probe.

Amberger U.S. Pat. No. 3,835,696 discloses a vibration detecting probe for use with rotating machinery and a mounting structure for the probe.

Birchall U.S. Pat. No. 3,979,739 discloses an apparatus and associated electrical circuit for detection of vibration in rotating machinery.

Harwell U.S. Pat. No. 4,010,637 discloses a method and monitoring apparatus for detection of vibration in rotating machinery.

Hoffman U.S. Pat. No. 4,018,083 discloses a probe holder for a vibration detection probe.

Polovnikov U.S. Pat. No. 4,213,346 discloses a method and apparatus for testing bearings and gear wheels and shafts and the like for mechanical defects.

Otawara U.S. Pat. No. 4,262,583 discloses a method and apparatus for detecting rubbing between a rotating body and a stationary body adjacent thereto.

Hilgner U.S. Pat. No. 4,367,650 discloses a fixture for mounting a vibration sensor near machine parts having limited access.

Hubbard U.S. Pat. No. 4,379,291 discloses a bearing failure indicator for electric motors and the like including a remote sensor probe and associated electric circuit.

SUMMARY OF THE INVENTION

One of the objects of this invention is to provide a new and improved system and apparatus for detection of vibration and movement in rotating shafts and registering the same on a remote viewing monitor.

Another object of this invention is to provide a new and improved monitoring system and apparatus for rotating shafts having a novel vibration and movement detecting probe assembly and adjacent associated circuitry.

Another object of this invention is to provide a new and improved system and apparatus for monitoring vibration and movement in rotating shafts including a novel field mounted signal conditioner having electric circuitry operable to screen out isolated vibrations from more substantial vibrations indicating a condition of near failure in a rotating shaft or the bearings associated therewith.

Another object of this invention is to provide a new and improved system and apparatus for monitoring rotating shafts for the presence of excessive vibration and movement therein and more particularly to a system having a remote viewing monitor.

Another object of this invention is to provide a new and improved remote viewing monitor and control circuitry therefor for use with a sensor probe for monitoring vibration and movement of a rotating shaft.

Other objects of this invention will become apparent from time to time throughout the specification and claims as hereinafter related.

The above stated objects and other objects of this invention are accomplished by an improved vibration and movement monitoring system and apparatus for monitoring rotating shafts, as in motors, pumps, blowers, generators, etc., and signaling the occurrence of an unsafe condition. The apparatus includes a vibration and movement monitoring probe assembly of improved design which is mounted adjacent to a rotating shaft and to the method of attachment thereon. The probe assembly is supported on the fixed housing of the rotating shaft in insulated relation thereto and includes a probe element in spaced relation to the shaft for contact therewith upon occurence of excessive vibration. A signal conditioner mounted near the probe assembly provides power to the probe and processes the signal and transmits it to the monitor. A remote monitor is provided which indicates excessive vibration and movement in response to a signal from the probe. An electronic circuit is provided which detects and registers the excessive vibration and movement on the monitor through a visual and audible alarm. The system also includes circuits for shutting down the rotating shaft upon occurrence of excessive vibration and movement. A single monitor may register signals from several different probe assemblies and signal conditioners.

BRIEF DESCRIPTION OF THE DRAWINGS

FIG. 1 is a side elevation of a compressor having a vibration and movement monitoring probe installed in accordance with this invention.

FIG. 2 is a side elevation of an electric motor with a monitor probe installed for monitoring vibration and movement thereon.

FIG. 3 is a left end view of the assembly shown in FIG. 2.

FIG. 12 is a circuit assembly diagram for the control unit and remote monitor.

DESCRIPTION OF THE PREFERRED EMBODIMENT

Figure 4:
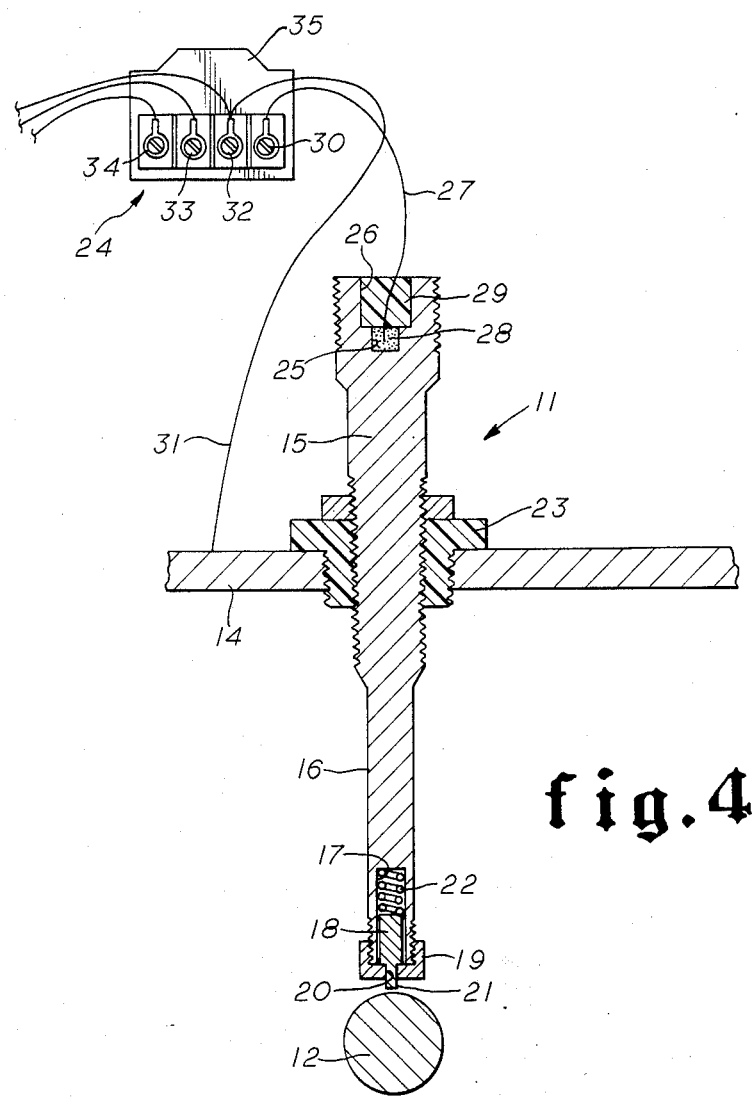
FIG. 4 is an enlarged section showing the monitor probe and its relation to the rotating shaft being monitored.

Referring to the drawings by numerals of reference, there is shown an improved system and apparatus for monitoring rotating machinery. The system comprises a probe, the signal conditioner and the monitor, described in detail below. This system provides a reliable way to monitor shaft movement and bearing wear of rotating machinery used in industry.

In FIGS. 1-4, there are shown various views of the probe assembly. In FIG. 1, there is shown a centrifugal compressor 10 with contact sensors or probes 11 at opposite ends thereof. In FIGS. 3 and 4, the probes 11 are shown mounted in position to monitor the rotating shaft 12 of an electric motor 13. In each of these applications, the probe 11 is mounted on a bearing housing 14 for contact with rotating shaft 12. In other types of equipment, the probe 11 is mounted in any suitable position, external or internal, for contact with the rotating shaft.

The probe 11 is mounted directly to the piece of equipment to be monitored for shaft movement. It can be mounted externally or internally, depending on the particular desires of the customer. The main body 15 of probe 11 is of stainless steel (ASM 304). The lower end 16 of probe body 15 has a cylindrical recess 17 in which there is positioned a cylindrical tip element 18, preferable of ASE 660 brass. A retainer cap 19 is threadedly secured on the lower end 16 or probe body 15. Cap 19 has an aperture 20 through which the tip 21 of tip element 18 extends. A spring 22 is positioned in the cavity 17 above the tip element 18, and exerts a light pressure thereon at all times.

Clearance between tip 21 and shaft 12 is preset to the clearance desired on any particular piece of rotating equipment. Feeler gauges are used on externally mounted probes, and locked into place by the lock nut provided on the probe assembly. Internally mounted probes are set in place using a portable micrometer, and an electrical test light to determine shaft contact. Backing off the probe body 15, and using the micrometer to preset the clearance on the probe tip until the desired number of thousandths of an inch is obtained, is the general procedure for this operation.

A nylotron (molded nylon) bushing 23 is inserted into equipment frame or mounting bracket 14 to insulate the probe from ground. The equipment frame is grounded from the signal conditioner 24 to be described below. Main body 15 of probe 11 has a small recess 25 and a counterbore 26 at its upper end. Wire 27 has one end positioned in recess 25 and sealed in place by solder 28 which is in turn sealed by epoxy resin 29 filling counterbore 26. The other end of wire 27 is connected to inlet terminal 30 on signal conditioner 24. Ground wire 31 connects frame 14 to ground terminal 32 on signal conditioner 24. Terminal 33 on signal conditioner 24 is connected to a 10 V. power source. Terminal 34 on signal conditioner 24 connects out to the remote monitor.

The probe tip 21 must contact shaft 12 to complete the circuit and activate signal conditioner 24, which sends the signal to the monitor (to be described below). When shaft contact is made, the monitor will activate the alarm and shutdown sequences described below.

Signal conditioner 24 is field mounted, enclosed in an explosion proof housing 35, and mounted near the equipment (10 or 13) to be monitored. The signal conditioner 24 provides a means of converting mechanical contact between sensor probe 11 and rotating shaft 12 to a well defined electrical signal.

Figure 9A:
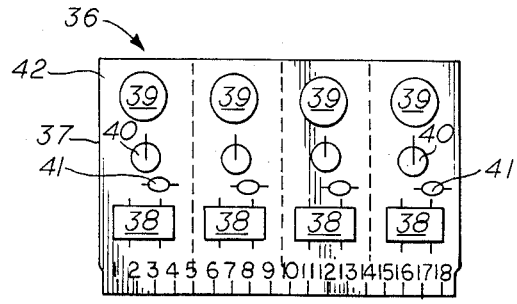
FIG. 9A is a plan view of the power supply for the probe assembly.
Figure 9B:
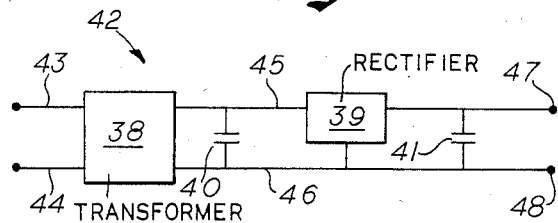
FIG. 9B is a circuit diagram for the power supply of FIG. 9A.

The signal conditioner assembly includes a four part power supply 36 for probe 11. In FIG. 9A, power supply 36 is shown as board 37 having terminals 1-18. Board 37 is divided into four distinct areas with power transformers 38 (VM 68C), rectifiers 39, and capacitors 40 and 41. FIG. 9B shown a detail of one of the power circuits 42. Circuit 42 has AC applied through terminals 43 and 44 on transformer 38 which are terminals 1 and 2 on board 37. The output of transformer 38 is passed through lines to terminals 47 and 48 which are terminals 3 and 4 on board 37, i.e. the output terminals from the power supply. Rectifier 39 is connected in line 45. Capacitor 40 (20 V., 45 mf.) is connected between lines 45 and 46. Capacitor 41 (0.1 mf) is connected between terminals 47 and 48. The output at terminals 47 and 48 is 12 V. DC.

Figure 7:
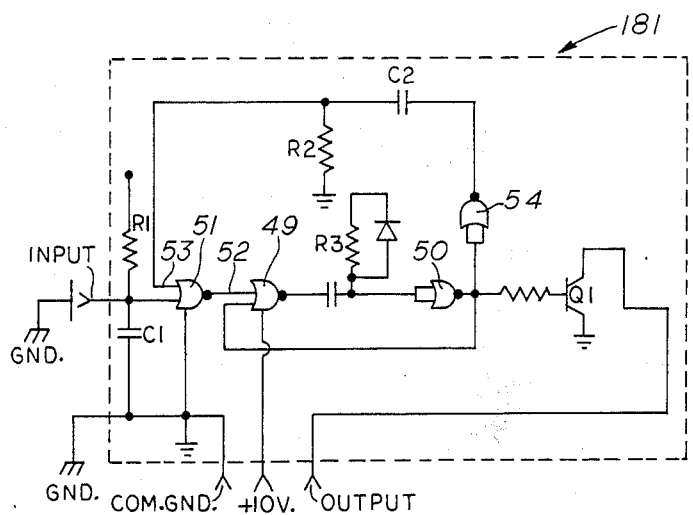
FIG. 7 is a circuit diagram for the field installed signal conditioner.

Signal conditioner 24 is designed around a basic "one shot" multivibrator comprised of "NOR" gates 49 and 50 (FIG. 7). "NOR" gate 51 serves to invert the negative/true logic of the sensor-to-shaft-contact to the required positive/true logic of the "one shot" input at pin 52 of "NOR" gate 49. "NOR" gate 51 also serves to "gate" out the sensor signal for approximately ten milliseconds after the "one shot" has completed a period. The ten millisecond "inhabit" signal on pin 53 of "NOR" gate 51 is generated by "NOR" gate 54 in conjunction with R2 and C2. The additional ten milliseconds insures a minimum limit on the time between the pulses at the output of the "one shot" and also allows the "one shot" to reset in the unlikely event that the sensor should make constant, uninterrupted contact with the shaft.

The output of the multivibrator supplies the drive current to transistor Q1 and is approximately one second in duration. During the active period of the "one shot" the collector of Q1 is taken to ground, supplying a current path for the opto-isolator circuit in the control unit.

The signal conditioner allows for variations in the resistance from the shaft to the motor or pump housing. This resistance path varies from one application to another. R1 sets the maximum value of resistance that the aforementioned path can have by forming a voltage divider with this path. In FIG. 7, R1 is shown to be a one megohm resistor. Since the threshold voltage of a CMOS gate is approximately 40% of supply, this means that in order for probe-to-shaft contact to be recognized by "NOR" gate 51, the resistance path to be the housing cannot exceed approximately 0.6 megohms. If R1 is reduced to 10,000 ohms, the resistance of the path of the housing cannot exceed 6,000 ohms.

It is desirable to keep R1 as low as the bearing resistance path of a given application will allow. High values of R1 are more suceptible to false alarms from oil or other matter getting between the shaft and the sensor. In applications where the resistance path through the bearings is high it is necessary to prevent any kind of contamination between the shaft 12 and the sensor 11.

Figure 8:
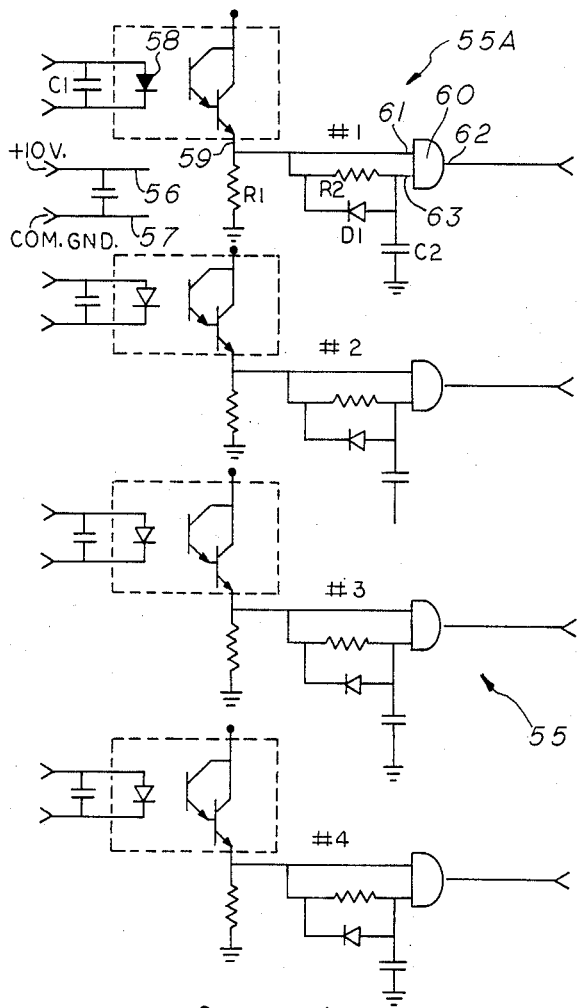
FIG. 8 is the isolator/test circuit for the control unit.

The alarm signal generated by the signal conditioner 24 and the power required by this circuit are carried by shielded transmission lines 11A running between the control unit and the field. Commercially available safety barriers are employed in this unit to insure that the voltage and current values reaching the field do not exceed levels that have been established as hazardous in explosive gas/air mixtures. These barriers are located on the back of the control unit cabinet before the signal gets to the Isolator/Test circuit 55 (FIG. 8).

The Isolator/Test circuit 55, as its name implies, performs two functions. In FIG. 8, circuit 55 is shown as four separate circuits or channels #1, #2, #3 and #4 which function separately. The circuit is only one of the four channels will be described. The circuit is powered by power line 56 and grounded through common ground 57.

The open collector output in signal conditioner 24 supplies a ground return for the light emitting diode 58 in opto isolator circuit 55A. Capacitor C1 bypasses any short duration noise spikes. The opto isolator (4N33) isolates the control unit electronics from all external circuitry from the transmission lines outward to the signal conditioner 24. The control unit has a separate power supply 36 of the signal conditioner 24 and opto isolator input to insure complete isolation.

Any signal felt by the light emitting diode 58 in the opto isolator will be seen on the output of the opto isolator at pin 59. At this point the signal has entered the realm of the control unit and is tested by "AND" gate 60 and associated circuitry. When the signal voltage at pin 59 of the opto isolator gate "high" it is seen immediately at pin 61 of "AND" gate 60. Before the output of "AND" gate 60, pin 62, can go high; pin 63 of the "AND" gate 60 must have approximately 40% of the signal amplitude present on its other input, pin 63. Capacitor C2 and resistor R2 form a delay circuit of approximately 300 milliseconds. After 300 milliseconds has passed since the signal appeared, a logic "high" will be present on the second input of "AND" gate 60, pin 63. At this time the output of "AND" gate 60, pin 62, will go "high" indicating that a signal in excess of 300 milliseconds has entered the Isolator/Test circuit. Since the duration of noise falls well below this time period, and the signal conditioner 24 generates logic "high" voltage pulses lasting approximately one second, the control unit can treat any signal coming from the Isolator/Test circuit 55 as an alarm signal.

Diode D1 serves to discharge capacitor C2 after each signal pulse has ended, allowing for accurate delay periods each time the signal goes "high." "AND" gate 60 provides the high input impedance required by the delay circuit R2/C2 and also serves to shape the alarm signal coming out of the Isolator/Test circuit 55. Once a pulse or series of pulses come out of the Isolator/Test circuit 55 it is necessary to determine if the alarm is caused by random pulse, intermittant contact, or an actual alarm condition.

Figure 11:
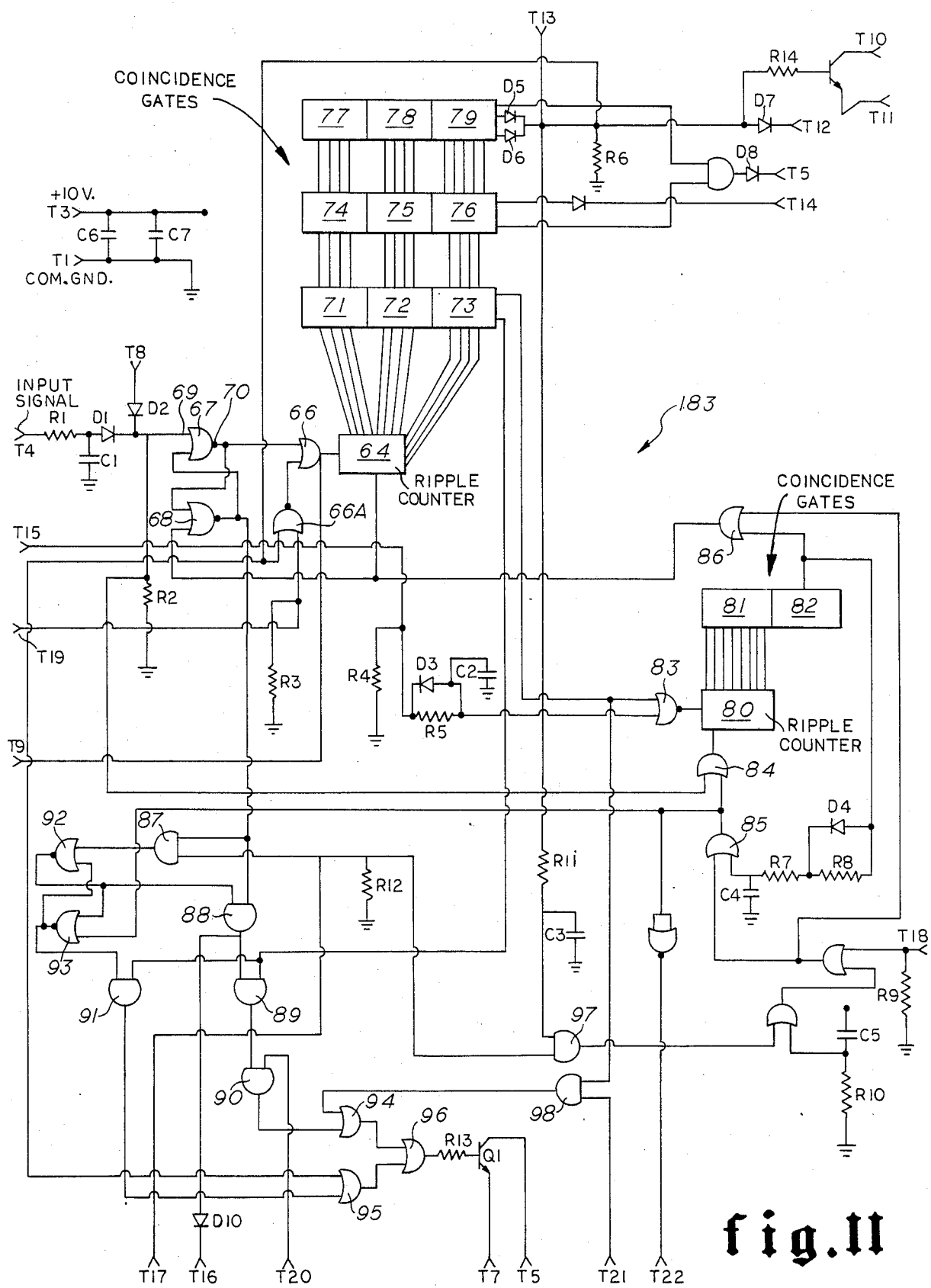
FIG. 11 is a logic diagram for the monitor and control unit.

Circuits as shown in FIG. 11 allow the operator the option of defining three possible conditions by changing the length of each of a series of three concatenated time periods that are initiated at the beginning of an alarm. There is another time period that begins in parallel with the first of the aforementioned three and is referred to as the "maximum time between pulses" period.

The three main time periods are:

First. The period of time beginning with the first alarm pulse in which the control unit automatically closes down the alarm state if the alarm pulses stop (random pulse) or become too widely spaced (intermittent contact). This time period is identified by a one cycle per second flashing red light and "beeping" horn. Pressing an acknowledge button silences the horn and causes the light to glow steady. This period ends with:

Second. The start of the second period of time during which the control unit has taken over control of the alarm situation and no longer requires alarm pulses in order to continue timing (alarm condition). This period is identified by the same red light that glowed steady after acknowledgement during first time period. This light will then begin to flash on and off at a rate of four times per second. During this period the alarm condition is said to be in the "inevitable shutdown" mode. This period ends with:

Third. The start of the third time period. This is usually a short period, though not necessarily, and is referred to as the "shutdown warning" period. It is identified by the horn beginning to "beep" in sequence with already four times per second flashing light of the second time period.

The connections labeled with the prefix "T" are terminal connections which may be connected to more than one circuit, as in the case of parallel circuits or circuit networks. In FIG. 11, terminal T3 is connected to 10 V. power supply and T1 to a common ground for the circuit. The signal from the signal conditioner enters through T4. T15 is connected to receive reset counter pulses from the normally closed shutdown switch. T18 receives reset counter pulses from test CQT. T19 is connected to receive 1 CPS/1 KC signal from the shutdown switch. T9 is connected to send counter pulses out to the shutdown switch. T22 sends reset signals out for the digital counter.

T16 provides a connection to enable the 1CPS horn. T5 is connected to enable the horn circuit. T6 connects to the alarm light driver and T10 to the down light driver. T13 is connected to enable/disable the shutdown relay driver. T20 and T21 are connected to receive clock pulses from a quartz clock. T7 and T11 are connected to the lamp power supply common. T12 is connected to the trigger pulse for horn "one shot". T17 is connected to the acknowledge/reset button.

In this circuit, coincidence gates have been employed to facilitate programming of the time periods. Integrated circuit number 64 is a ripple counter that counts one second pulses coming from a crystal clock oscillator connected to T20 through circuits including gates 87-98. The clock pulses are gated to the ripple counter by "NOR" gate 66 and 66A when the set/reset flip flop, comprised of "NOR" gates 67 and 68 senses an alarm pulse at pin 69 of "NOR" gate 67. "NOR" gate 67 sets, taking its pin 70 to a logic "0". This allows the ripple counter 64 to start adding up the clock pulses. Coincidence gates 71 through 79 monitor the accumulating count in ripple counter 64 and compares it to various preset counts. The preset counts are programmed with wire jumpers and makes it possible for the operator to change the time of each of the four time periods.

The first time period allows the control unit to decide if the alarm is caused by random or intermittent pulse. This is accomplished with the help of a second "ripple" counter 80 with programmable coincidence gates. This "ripple" counter totalizes the same clock pulses 65 as "ripple" counter 64 and is connected through "NOR" gate 83. The time programmed on coincidence gates 81 and 82 is the "maximum time between pulses" period. This counter 80 differs from counter 64 in that the alarm pulses serve to reset it. Each time an alarm pulse form the Isolator Test circuit 55 appears it will cause the ripple counter 80 to reset.

If the time between alarm pulses exceeds the "maximum time between pulses" programmed into coincidence gates 81 and 82 of "ripple" counter 80, the count will be allowed to reach its programmed value. At this time, a pulse from coincidence gates 81 and 82 will reset the entire alarm system via gates 84, 85 and 86 causing the control unit to go back to the stand by (no alarm) condition. If, on the other hand, the alarm pulses remain continuous and closely spaced, the first main time period will end and the second will begin.

After coincidence gates 71, 72, and 73 "see" a count in "ripple" counter integrated circuit 64 that is equal to the programmed value, "ripple" counter integrated circuit 80 will be inhibited by gate 83 from counting any more clock pulses. This means that the alarm state is no longer dependent on pulses from the Isolator/Test circuit 55 for its existence and now enters the second time period, i.e. inevitable shutdown mode. As with the light and horn sequence described in the first time period, conventional gating techniques have been employed to cause the light to start flashing at the four times per second rate required to identify the second time period. With the exception of inhibiting "ripple" counter integrated circuit 80 and changing the sequence of the indicating light, the second time period simply marks time to the next main time period. When coincidence gates 74, 75, and 76 "see" a count on "ripple" counter integrated circuit 64 that is equal to the programmed time of the second time period, the alarm state enters the next main time period.

When the third time period, i.e. shutdown warning, begins, conventional gating is again employed to start the horn "beeping" in sequence with the already flashing light of the second time period. This time period also marks time until it reaches the programmed time in coincidence gates 77, 78 and 79. When the count in "ripple" counter integrated circuit 64 reaches this final count, conventional circuitry is employed to send out a logic level to a relay external of the control unit. This relay causes the motor turning the shaft being monitored to stop. When this occurs, the horn sounds continuously for about five seconds before it stops. A second, previously extinguished, light comes on to indicate that the motor has been shut down.

At any time during the three main time periods, the operator has two options open to him before the unit shutdown automatically. He can press a special button on the alarming channel and cause the motor to shutdown immediately. This button is enabled at the beginning of an alarm (start of first time period). If it is desired to allow the motor to continue running in spite of the alarm, switches have been provided to mechanically interrupt the shutdown logic and prevent it from reaching the external motor control relays.

A key operated switch on the control unit inhibits all logic lines running to the four external motor control relays. Conventional circuitry has been employed to allow the clock pulses to be used as simulated alarm pulses. A button is provided that allows the operator to simulate alarm pulses going into the set/reset flip flop of "NOR" gates 67 and 68 (see FIG. 11). These pulses enter the alarm circuitry through diode "D2". The test button is only enabled when the key switch is in the "Test" mode. In the "Test" mode, all logic lines running to the motor control relays are inhibited, therefore no motor shut down will be caused by simulated alarms. Also, when the key is returned to the "Run" mode all alarm circuits are reset to prevent unwanted shutdowns.

Figure 10A:
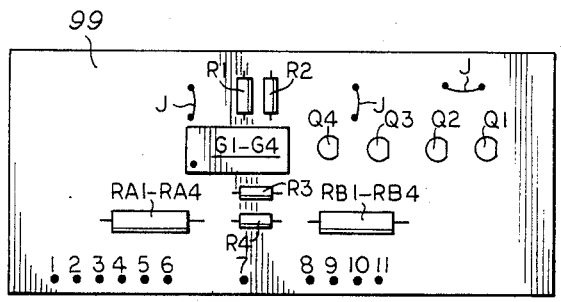
FIG. 10A is a plan view of the circuit board assembly for the motor coil relay drivers.
Figure 10B:
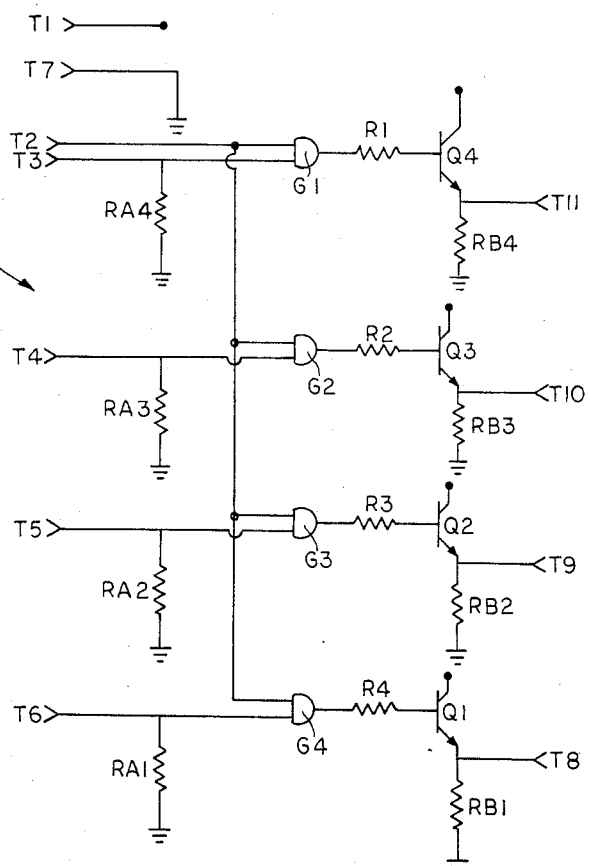
FIG. 10B is a circuit diagram for the circuit board assembly of FIG. 10A.

FIGS. 10A and 10B illustrate the motor control relay driver circuits 187. In FIG. 10A, board 99 supports gates G1-G4; resistors R1-R4; transistors Q1-Q4; relay control resistors RA1-RA4 and RB1-RB4; and jumpers J. Board terminals T1-T11 are connected to the circuits as shown. T1 is connected to a 10 V. power source. T7 is a common ground. T2 is an enable line. T3-T6 connect to channels 1-4 relay drive logic. T8-T11 connect out for channels 4, 3, 2 and 1, respectively.

Figure 5:
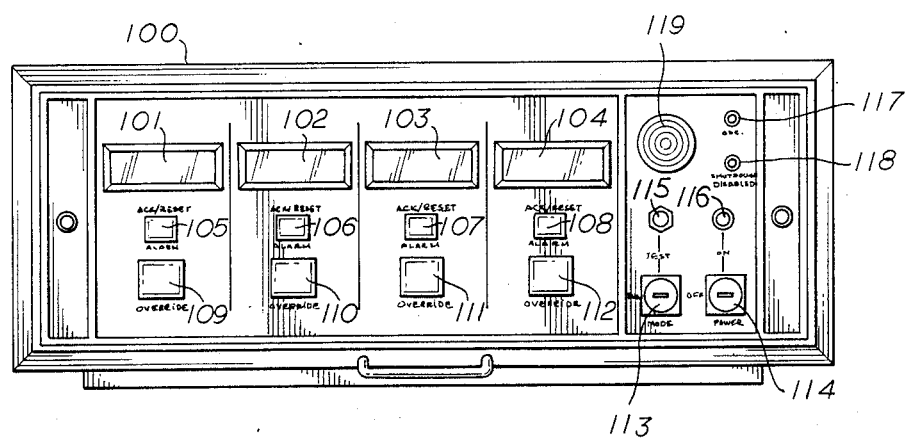
FIG. 5 is a view in front elevation of the remote viewing monitor of this invention.

FIG. 5 illustrates the monitor 100 display panel and controls. The panel has digital displays 101-104 for channels 1-4. Switches 105-108 are acknowledgement/reset switches for channels 1-4. Switches 109-112 are override switches for channels 1-4. Knob 113 is a switch for setting the system to test mode or running mode. Switch 114 is the power on/off switch. Switch or button 115 initiates the test mode. Neon light 116 indicates the power is on. LED 117 indicates the oscillator is on. LED 118 indicates a disabled or shutdown condition. Horn 119 provides an audible signal of an unsafe condition.

Monitor 100 is generally mounted in the control center of the plant, where the operator controls the unit functions. The operator then has access to observe the monitor along with other functions. The monitor 100 is highly visible and the red and amber lights are easily observed when lit. Key lock switches are incorporated in the panel front, to turn on the power to the monitor (switch 114), to lock in the run position for normal operations, disable and test modes (switch 113) are incorporated for checks of the system and maintenance work.

The electrical components are located on the inside of the cabinet, on a sliding chassis for easy access. The printed circuit boards are plug-in type, and contain the pins for time sequence programming. These PC boards are easy to install and remove by the maintenance person. The 120 VAC to the unit is covered for personnel protection, and is so indicated by the word "danger" printed on the plexiglass cover.

Terminal strips and intrinsically safe barriers are located in the back portion of the cabinet, with access from the back in the back portion of the cabinet, with access from the back panel cover. Electrical wiring to the monitor enters the back through standard electrical conduit and fittings. Electrical codes will be used as to customer requirements.

The front panel of the monitor houses the LED of the oscillator, the key lock functions, the power on light, the event counter, the down light and emergency shutdown button, and the acknowledge button. All functions of these items are covered in the operations procedure. An audible horn will sound when an alarm or shutdown condition exists. When the alarm is acknowledged the red light will glow steady and the horn will be silenced. When the shutdown sequence starts the red light will flash and the horn will start again. The event counter will count off the time until shutdown.

Main power switch 114 is a key operated switch to interrupt 120 VAC to the unit. The power-on indicator is a neon pilot light 116 to indicate when power is applied to the unit. The system disable switch is a key operated switch 113 to disable all motor starter coil relays and is used when working on the unit to prevent unwanted motor shutdown. This switch enables the "Test" button 115. Override buttons 109-112 are used to activate motor starter coil relays before the delay period has expired. Each button is mechanically configured to prevent accidental closure. Each button is enabled only during an alarm on the the corresponding channel. Pressing these buttons will have no effect unless an alarm state exists.

Alarm acknowledge/reset/indicators 105-108 are lighted push button switches used to indicate an alarm by flashing on and off at one second intervals; or to serve as the acknowledge button (pressing the button after an alarm state begins causes the indicator lamp to burn steady); or to reset the alarm circuit after the cause of the alarm is corrected. Motor shutdown indicator 118 serve as notice to operator that the corresponding motor has shutdown. Oscillator indicator 117 the LED that is driven by the one-second oscillator. It tells the operator, at a glance, that the system clock is operating. Annunciator or horn 119 is the source of audible alarm. Test button 115 is used to simulate alarm signals on all channels. It will cause logic circuitry to go through all its phases the same as if there was an alarm on all channels at once. This button is enabled only when the system disable switch is on.

The monitor housing encloses the motor starter coil relay disable switch. Each motor starter coil relay has this switch to provide the operator with a means to prevent shutdown after the "point of no return" has been reached in the timing sequence. All circuits for the monitor and control are in the main monitor housing in the control center. The circuits for the probe assembly and signal conditioner are located in the field.

Figure 6:
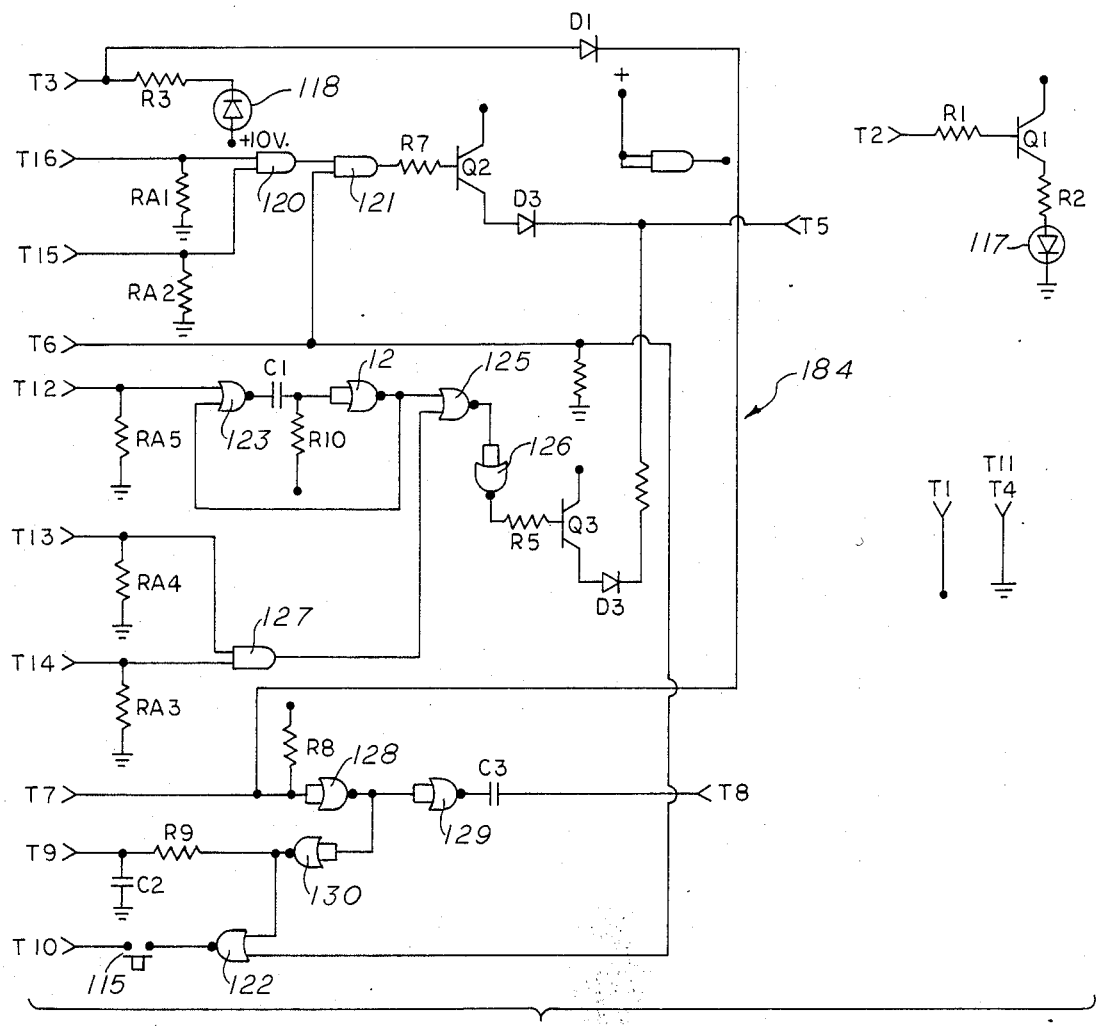
FIG. 6 is a front panel logic circuit for the remote monitor.

FIG. 6 illustrates the front panel logic control circuits 184. T1 is connected to a 10 V. power supply and T4 and T11 to a common ground. T2 is the input from the oscillator to the oscillator LED 117, through transistors R1 and R2 and transistor Q1. T3 is the input from the shutdown disable switch and lights shutdown/disable LED 118.

T15 enables 1 CPS horn during unacknowledged alarm if pin T16 is high. T16 enables 1 CPS horn if count in alarm counter is less than program time and if pin T15 is high. Circuit includes "AND" gates 120 and 121 and is connected out to horn by T5. T6 is the input for the 1 CPS oscillator signal and is connected to "AND" gate 121 and "NOR" gate 122. "NOR" gate 122 is connected through test button 115 to T10 which outputs the alarm "test"signal.

T12 is the input from shutdown to provide a three second horn signal through gates 123-126, transistor Q3, and diode D3. T13 receives the enable signal from main logic boards for 4 CPS horn, and as previously noted is connected to the disable circuit for the shutdown relay driver. T14 is a 4 CPS input. T13 and T14 input to "AND" gate 127. T7 connects from the run/test switch 113 through "NOR" gates 128 and 129 to T8 which connects to reset main logic circuit boards after test. T9 connects through "NOR" gate 130 to disable shutdown relay "AND" gates during test.

FIG. 12 is a circuit diagram interconnecting the various circuit components making up the monitor and controller. Circuit 184, the front panel logic circuit control (FIG. 6) is shown at the lower right side of the diagram controlled by switch 113 and connected to horn 119. Relay circuit control 187 (FIGS. 10A and 10B) is shown connected to the four separate channels of logic circuit 183 (FIG. 11). Power supply circuits 131 and 132 are shown in association with power supply 36 (FIGS. 9A and 9B). Each of the logic circuits 183 has a counter 133 as shown just below the control switches. The override switch is made up of four SPDT switches. If the operator desires to shut the motor down before the programmed time period has passed, this switch is used. Switch 110 serves to stop counter 80 (FIG. 11) from counting. Switches 111 and 112 increase the conting rate of counter 64 from 1 count per second to 1000 counts per second. The result will be that starting from the time the operator pushes the override button (switches 109-112), the total program time will be divided by 1000, resulting in a rapid program sequence culminating in shutdown.

OPERATION

The probe assembly is mounted on the housing 14 of the rotating shaft 12 as described above. The signal conditioner is mounted on or adjacent to the probe assembly 11 and connected to the monitor and controller 100. When the rotating shaft 12 vibrates excessively, electric contact is made and the signal processed by the signal conditioner 181 and monitor to register the condition and in some cases to shut down the motor or pump 10 or other rotating equipment.

The monitor 100 is generally mounted in the control center of the plant, where the operator controls the unit functions. The operator then has access to observe the monitor 100 along with other functions. The monitor 100 is highly visible and the red and amber lights are easily observed when lit. Key lock switches 113 and 114 are incorporated in the panel front, to turn on the power to the monitor 100, to lock in the run position for normal operations, disable and test modes are incorporated for checks of the system and maintenance work.

The electrical components are located on the inside of the cabinet, on a sliding chassis for easy access. Terminal strips and intriniscally safe barriers are located in the back portion of the cabinet, with access from the back in the back portion of the cabinet, with access from the back panel cover. Electrical wiring to the monitor 100 enters the back through standard electrical conduit and fittings.

The front panel of the monitor 100 houses the LED 117 of the oscillator, the key lock functions 113-114, the power on light 116, the event counter 101-104, the down light and emergency shutdown button, and the acknowledge button 105-108. All functions of these items are covered in the operations procedure. An audible horn 119 will sound when an alarm or shutdown condition exist. When the alarm is acknowledged the red light will glow steady and the horn 119 will be silenced. When the shutdown sequence starts the red light will flash and the horn 119 will start again. The event counter 101-104 will count off the time until shutdown.

Neon pilot light 116 indicates when power is applied to unit. System disable switch 114 (Key operated switch) disables all motor starter coil relays, is used when working on unit to prevent unwanted motor shutdown, and enables the "Test" button. Override buttons 109-112 are used to activate motor starter coil relays before the delay period has expired. Each button is mechanically configured to prevent accidental closure. Each button is enabled only during an alarm on the the corresponding channel. Pressing these buttons will have no effect unless an alarm state exists.

Alarm acknowledge/reset/indicators 105-108 are lighted push button switches used to indicate an alarm by flashing on and off at one second intervals; or serve as the acknowledge button (pressing the button after an alarm state begins causes the indicator lamp to burn steady); or reset the alarm circuit after the cause of the alarm is corrected.

Motor shutdown indicators serve as notice to operator that the corresponding motor has shutdown. The oscillator indicator is the LED that is driven by the one second oscillator. It tells the operator, at a glance, that the system clock is operating.

The annunciator or horn 119 is the source of audible alarm. The test button is used to simulate alarm signal on all channels. It will cause the logic circuits to go through all the phases the same as it there was an alarm on all channels at once. This button is enabled only when the system disable switch is on.

Before applying power to the monitor 100 all rear panel connections to the field mounted sensors should have been made. The "Run/Test" key 113 is turned to the "Test" position and the unit turned on with the Power "On/Off" key. After about 5 seconds, the "Run/Test" key is turned to the "Run" position. The monitor 100 is now ready for operation. Proper operation of the clock oscillator can be checked by observing the LED 117 in the upper right hand corner of the front panel labeled "OSC". This indicator should flash on and off with a 1 second period. If this LED 117 is not indicating properly the monitoring will not sequence correctly, if at all.

The LED 118 below the "OSC" LED 117, labeled "Shutdown Disabled" should not be on if the unit is to be able to stop any of the motors it is monitoring. The LED 118 will be on if any one or more of the shutdown disable switches is in the "Disabled position, or if the "Run/Test" key is in the "Test" position. The shutdown disable switches are located inside the unit and can be reached by turning the thumb screws on each side of the front panel. This will release the latch and allow the chassis to slide out of the cabinet. The switches are located on a bracket channel on the right side of the chassis. Disabling the shutdown on a channel does not prevent that channel from alarming, it simply prevents the shutdown signal from getting out to the external motor control relays. When the "Run/Test" key is in the "Test" position all shutdown circuits are disabled. This prevents unwanted motor shutdown when performing a functional test or working on the monitor 100's circuitry.

It is advisable to perform a functional test of the monitor 100 electronics biweekly. Although the logic circuitry prevents motor shutdown when operating in the "Test" mode, it is advisable to slide the chassis out and put all channel "shutdown disable" switches in the "Disabled" position. This prevents unwanted motor shutdown during testing in the unlikely event of component failure in the automatic disable circuit. To perform a test place the "Run/Test" key 113 in the "Test" position and press the "Test" button. The "Test" button 115 simulates sensor contact on all channels by switching clock pulses into the alarm input of each channel. In order to confirm proper operation of the monitor 100 you will have to know the sequence program of each channel. Each channel has four programmable periods as follows.

1. Maximum time between contacts

All it takes is one contact between the shaft and sensor to trigger the alarm. If the alarm is a "fluke" resulting from a flake of rust or some unknown cause the alarm will go off but automatically reset after the "maximum time between contacts" have elapsed.

To time this function place the key in the "Test" position. Hold the test button in until the monitor 100 alarms then release the button. Each channel should reset after the "maximum time between contacts: for that channel has elapsed.

2. Inevitable shutdown

If contacts are sensed with a period between them of less than the time in the program of number 1 above, the unit will not reset. The alarm counter will continue counting 1 second pulses. When the time programmed into the "Inevitable shutdown" comparator is reached the "Ack/Reset" light corresponding to that channel will begin to flash at a rate of 4 times per second. At this point the unit ignores the shaft sensor and allows the alarm counter to count out to shutdown without interruption.

To test this function proceed as described above, but do not release the "Test" button for periods exceeding the "maximum time between contacts" program. When the count reaches the time programmed into each channel for "Inevitable shutdown", the "Ack/Reset" light corresponding to that channel should begin the 4 c.p.s. flash rate. Do not press the test button anymore after this point has been reached.

3. Shutdown warning

If the alarm counter makes it to this point it will cause the horn 119 to beep in sequence with the 4 c.p.s. flashing light. This program will begin 10 or 15 seconds before actual shutdown.

To test this function allow the counter to continue as described above. When the time programmed in the different channels "Shutdown warning" comparators is reached, the horn 119 will begins to sound.

4. "Shutdown"

When this time is reached, each channel indicates it by causing the horn 119 to sound steady for about 3 seconds. Also, "Ack/Rest" light corresponding to that channel will burn steady.

To test this function simply allow the sequence that began above to continue until the different shutdown times for the channels are reached. Confirm that each channel indicates as described above when the corresponding "shutdown" times are reached.

The final test involves going to each sensor probe and simulating a shaft contact. If the channels are still on from the previous test, press the "Ack/Reset" button 105–108 on each channel. With the key 113 still in the "Test" position and all channel "Shutdown disable" switches in the "Disabled" position have someone go to each sensor in turn and remove the terminal block cover on the sensor. Use a piece of wire and momentarily short the terminals labeled "in" and "gnd" together. The corresponding channel should alarm and reset after the programmed time period described in #1 above.

After the unit has been tested and is ready to be put on line, turn the "Run/Test" key to the "Run" position and place all the "Shutdown disable" switches in the "Enable" position. The monitor 100 is now operational.

When a contact is sensed by the sensor probe 11, the corresponding channel red alarm light will flash on and off with a one second period. The horn 119 will sound each time the light flashes on. Press the alarm light 105–108 will acknowledge the alarm, silencing the horn 119 and turning the alarm light on steady (each alarm light has corresponding points on the rear terminal strip for optional remote indicators).

If contacts are erratic with periods between them exceeding the "Maximum time between contacts" program, the alarm will go off and reset as described previously. Of course, if this happens more than once or twice the shaft/sensor should be checked. If the contacts are sufficiently continuous the alarming channel will go into the "Inevitable shutdown" mode. When the shutdown is reached and red "Alarm" light will burn steady and the blue "Down" light will come on.

If, during an alarm, it is decided to shut the motor down before the time sequence has ended; simply lift the protective cap on the "Override" button/light and press the button 109-112. The button 109-112 should light up blue and indicate the motor to be down. At the same time the horn 119 will sound for about 3 seconds. Pressing the Override: or Ack/Reset button during a period when there is no alarm will have no effect.

It is recommended to leave the channel in the down mode until the problem at the shaft is corrected. if the channel is reset, it will alarm every time the sensor makes contact during repairs.

The four time programs described in the "operation" section are implemented on circuit 183 board. Two methods for programming this board are by wire wrapping or using the optional "clips." Which ever method is used to make the actual connection, proceed as follows:

Assume the following times are desired:
Time between contacts—20 sec
Inevitable shutdown—45 sec
Warning—105 sec
Shutdown—102 sec The four columns of programming pins are "Time between contacts", "Inevitable shutdown", "Warning", and "Shutdown". Starting at the top, each row of contacts has a numerical value that increases as you move down the board. When the "Time between contacts" program is to be wired take the time in seconds, which is 20 in this case, and start comparing the time with the numerical value of each row, beginning at the bottom. For every row with a value greater than the time put a "0" in that box corresponding to that row. For a row with a value equal to the time, place a "1" in the corresponding box and zeros in the remaining boxes. For to a row with a numerical value of less than the time put a "1" in that box and subtract the number from the time. Now take this difference number and continue comparing, starting at the next row. Continue in this manner ending with a difference of zero. If the numerical value of all the boxes having 1's in them is added, the answer should equal to the program time.

The following sequence of events illustrate the operation of the system:
A. If no alarm state exists.
  1. "Power on" indicator 116 is only light showing except for oscillator LED 117.
  2. Oscillator LED is flashing at all times to indicate proper operation of oscillator.
B. Series of shaft contacts are sensed by the sensor probes 11 at no more than 29 second intervals.
  1. Corresponding alarm light begins to flash at one second intervals on control panel and on unit repeater.
  2. Sonalert horn 119 begins to sound in sequence with flashing light (control room only).
  3. Shut down counter begins to count 1 sec. pulses from oscillator.
  4. reset counter begins to count 1 sec pulses from oscillator.

Operator should acknowledge alarm at this time. Failure to acknowledge alarm does no harm; sonalert 119 will just continue to sound at maximum level and alarm light will continue to flash in sequence. Acknowledgement is accomplished by pressing the alarm light itself which will silence the alarm and cause the alarm light to burn steady.

C. Two minutes pass since first shaft contact was sensed by sensor probe.
  1. Regardless of its previous state, flashing unacknowledged or burning steady, the alarm light begins to flash rapidly. This indicates shutdown is inevitable regardless of signal from shaft sensor. At this point, shutdown can only be avoided by an inhibit switch located in the cabinet.
D. Four minutes forty five seconds after first shaft contact was sensed.
  1. Sonalert 119 begins to beep (muted) in sequence with the alarm light that started flashing at the two minute point. If alarm was never acknowledged, the sonalert 119 has been beeping at the slow rate all this time. The alarm light, however, has gone from the slow flash rate to the fast flash rate (at the two minute point). The unacknowledged sonalert 119 will simply go from slow, full level beeping to fast, muted beeping.
E. Five minutes after first shaft contact was sensed.
  1. Sonalert 119 is silenced
  2. Alarm light 105-108 burns steady.
  3. Motor shutdown indicator on front panel is on steady.
  4. Motor starter coil relay activated.

The time specified are all adjustable from 0 to 999 seconds with 1 second resolution. Changing these time settings will be accomplished on the printed circuit board corresponding to the channel of interest.

In operation, the signal conditioner provides a means of converting mechanical contact between a sensor and spinning shaft to a well defined electrical signal as previously described. It allows for resistance paths of up to approximately ½ megohms so contact can be sensed through bearings at a mechanically static point on the motor or pump housing.

The control unit or monitor
A. Utilizes commercially available voltage/current limiting devices on all out going and incoming lines to yield an intrinsically safe system.
B. Distinguishes between the alarm signal from the field mounted signal conditioner and any noise that may be induced in the transmission lines running to the field.
C. Distinguishes between intermittent and continuous irregularities with a set of guidelines that are programmable.
D. Notifies operator of improper gyrations of a spinning shaft by visual and audible means.
E. Allows the operator a programmable span of tim in which to decide on a plan of action:
F. Provides a means of testing the electronics of the entire system without affecting the shafts being monitored.

While this phase of the operation has been discussed in part above the various time periods of operation of the control unit or monitor should be considered. The main time periods are defined as follows:
  1. The period of time beginning with the first alarm pulse in which the control unit will automatically close down the alarm state if the alarm pulses stop (random pulse) or become too widely spaced (intermittant contact). This time period is identified by a one cycle per second flashing red light and "beeping" horn 119. Pressing an acknowledge button will silence the horn 119 and cause the light to glow steady. This period ends with:

2. The start of the second period of time during which the control unit has taken over control of the alarm situation and no longer requires alarm pulses in order to continue timing (alarm condition). This period is identified by the same red light that glowed steady after acknowledgement during time period number 1. Now this light will begin to flash on and off at a rate of 4 times per second. During this period the alarm condition is said to be in the "inevitable shutdown" mode. This period ends with:

3. The start of the third time period. This is usually a short period, though not necessarily, and is referred to as the "shutdown warning" period. It is identified by the horn 119 beginning to "beep" in sequence with already 4 time per second flashing light of time period number 2.

The ripple counter counts one second pulses coming from the crystal clock oscillator. The clock pulses are gated to the ripple counter by "NOR" gates when the set/reset flip flop senses an alarm pulse. Another "NOR" gate sets, going to a logic "0". This allows the ripple counter to start adding up the clock pulses. Coincidence gates monitor the accumulating count in the ripple counter and compares it to various preset counts. The preset counts are programmed with wire jumpers which makes it possible for the operator to change the time of each of the four time periods.

The first time period allows the control unit to decide if the alarm is caused by random or intermittent pulse. This is accomplished with the help of a second "ripple" counter with programmable coincidence gates which totalizes the same clock pulses as th first "ripple" counter. The time programmed on this counter's coincidence gates is the "maximum time between pulses" period. This counter differs from the first in that the alarm pulses serve to reset it. Each time an alarm pulse from the isolator test circuit appears it will cause the ripple counter to reset.

If the time between alarm pulses exceeds the "maximum time between pulses" programmed into the coincidence gates 13 of the second "ripple" counter, the count will be allowed to reach its programmed value. At this time a pulse from its coincidence gates will reset the entire alarm system via another set of gates causing the control unit to go back to the stand by (no alarm) condition. If, on the other hand, the alarm pulses remain continuous and closely spaced, the first main time period will end and the second will begin.

After coincidence gates "see" a count in the first "ripple" counter that is equal to the programmed value, the second "ripple" counter will be inhibited from counting any more clock pulses. This means that the alarm state is no longer dependent on pulses from the isolator/test circuit for its existence and it now enters time period number 2 (inevitable shutdown mode). As with the light and horn 119 sequence described in time period 1, conventional gating techniques have been employed to cause the light to start flashing at the 4 times per second rate required to identify time period number 2.

With the exception of inhibiting the second "ripple" counter and changing the sequence of the indicating light, time period number 2 simply marks time to the next main time period. When coincidence gates "see" a count on the first "ripple" counter that is equal to the programmed time of period number 2, the alarm state enters the next main time period.

When time period number 3 (shutdown warning) begins, conventional gating is again employed to start the horn 119 "beeping" in sequence with the already flashing light of time period number 2. This time period also marks time until it reaches the programmed time in the coincidence gates. When the count in the first "ripple" counter reaches this final count, conventional circuitry is employed to send out a logic level to a relay external of the control unit. This relay will cause the motor turning the shaft being monitored to stop. When this occurs the horn 119 will sound continuous for about 5 seconds before it falls silent. A second heretofore extinguished light will come on to indicate that the motor has been shut down.

At any time during the three main time periods, the operator has two options open to him before the unit shutdown automatically. He can press a special button on the alarming channel and cause the motor to shut down immediately. This button is enabled at the beginning of an alarm (start of time period 1). If it is desired to allow the motor to continue running in spite of the alarm, switches have been provided to mechanically interrupt the shutdown logic and prevent it from reaching the external motor control relays.

A key operated switch located on the control unit inhibits all logic lines running to the four external motor control relays. Conventional circuitry has been employed again to allow the clock pulses to be used as simulated alarm pulses. A button is provided that allows the operator to simulate alarm pulses going into the set/reset flip flop of "NOR" gates. These pulses enter the alarm circuitry through a diode. The test button is only enabled when the key switch is in the "Test" mode all logic lines running to the motor control relays are inhibited, therefore no motor shut down will be caused by simulated alarms. Also, when the key is returned to the "Run" mode all alarm circuits are reset to prevent unwanted shutdowns.

The only remaining components to be tested are the field mounted signal conditioner, transmission lines, safety barriers, and the isolator/test circuits. These can be tested by putting the key switch in the "Test" position and going to each field mounted signal conditioner and shorting the input terminal to ground. This will cause the field mounted signal conditioner to respond the same as it would in the case of an actual sensor/shaft contact. However, since the key is in the test mode no shutdown will occur from the resulting simulated alarm.

While this invention has been described fully and completely with special emphasis upon a preferred embodiment, it should be understood that within the scope of the appended claims the invention may be practiced otherwise than as specifically described herein.

We claim:

1. An apparatus for monitoring vibration and movement of a rotating shaft, relative to its center axis, in machinery comprising a probe assembly adapted to be supported on the fixed housing of a rotating shaft in insulated relation thereto and adjacent to the shaft bearing, said probe assembly including a probe element positioned, when supported on said housing, in spaced relation to the rotating shaft for contact therewith in the event of a predetermined movement of said shaft relative to its center axis, said probe element having an elongated body of electrically conductive metal having an enlarged outer end, an intermediate portion of reduced diameter threaded for support on said shaft housing, and a smaller inner end portion having an end recess, a probe member slidably positioned in said end recess, a cap member closing the end of said recess and securing said probe member therein, a spring member positioned in said recess urging said probe member against said cap member with the end portion protruding outward therefrom, and said probe member end portion being adapted to make electrical contact with said shaft on excessive movement of said shaft, a signal conditioner including first circuit means adapted to be connected to said probe assembly including power supply means for supplying electric current to said probe assembly and having an open circuit portion completed upon contact of said probe element with said rotating shaft, a remote monitor having second circuit means responsive to said first circuit means to indicate contacts of said rotating shaft with said probe element, and alarm means for signaling the occurrence of a predetermined degree of movement of said rotating shaft including third circuit means responsive to said first circuit means.

2. An apparatus according to claim 1 in which said signal conditioner first circuit means comprises a power supply circuit adapted for connection to a source of electric power, a transformer, a rectifier, and a capacitor, a multivibrator comprising a pair of NOR gates connected in circuit with said probe assembly, an isolator/test circuit including an AND gate connected to receive the output from said multivibrator, said signal conditioner being operable to energize said probe assembly on contact of said probe element with said shaft, and to transmit an intermittent signal to said monitor, said monitor comprises switch means connected to switch external power between off and on, a digital counter connected to count the time since first contact was detected and to indicate the time left before shutdown, said alarm means including optical signal means indicating intermittent contact by said shaft and said probe element, and signal means indicating predetermined excessive contact by said shaft and said probe element, and counting means for distinguishing intermittent signals from said probe assembly from predetermined excessive signals and operable to energize said optical signal means on occurrence of said intermittent signals and to energize said last named signal means on occurrence of said predetermined excessive signals, said counting means comprises a clock signal generator, first and second ripple counters connected to receive the output from said clock signal generator, programmable coincidence gates associated with said first and said second ripple counters to compare the counts, said second ripple counter being connected to receive signals from said probe assembly and signal conditioner causing said second ripple counter to reset, and further including a test circuit interconnecting said first named and second named signal means and said signal conditioner and having a switch operable to initiate a test sequence for verifying that the apparatus is operative, and switch means associated with said optical signal means to acknowledge an unsafe condition and shut down operation of said shaft and to reset the monitor for further operation.

3. An apparatus according to claim 1 in which said monitor comprises switch means connected to switch external power between off and on, a digital counter connected to count the time since first contact was detected and to indicate the time left before shutdown, said alarm means including optical signal means indicating intermittent contact by said shaft and said probe element, signal means indicating predetermined excessive contact by said shaft and said probe element, and counting means for distinguishing intermittent signals from said probe assembly from predetermined excessive signals and operable to energize said optical signal means on occurrence of said intermittent signals and to energize said last named signal means on occurrence of said predetermined excessive signals.

4. An apparatus according to claim 3 in which said counting means comprises a clock signal generator, first and second ripple counters connected to receive the output from said clock signal generator, programmable coincidence gates associated with said first and said second ripple counters to compare the counts, and said second ripple counter being connected to receive signals from said probe assembly and signal conditioner causing said second ripple counter to reset.

5. An apparatus according to claim 3 including switch means associated with said optical signal means to acknowledge an unsafe condition and shut down operation of said shaft and to reset the monitor for further operation.

6. An apparatus according to claim 1 in which said monitor comprises switch means connected to switch external power between off and on, a digital counter connected to count the time since first contact was detected and to indicate the time left before shutdown, said alarm means including optical signal means indicating intermittent contact by said shaft and said probe element, audible and optical signal means indicating predetermined excessive contact by said shaft and said probe element, counting means for distinguishing intermittent signals from said probe assembly from predetermined excessive signals and operable to energize said optical signal means on occurrence of said intermittent signals and to energize said last named signal means on occurrence of said predetermined excessive signals, switch means associated with said optical signal means to acknowledge and unsafe condition and shut down operation of said shaft and to reset the monitor for further operation, said counting means comprises a clock signal generator, first and second ripple counters connected to receive the output from said clock signal generator, programmable coincidence gates associated with said first and said second ripple counters to compare the counts, said second ripple counter being connected to receive signals from said probe assembly and signal conditioner causing said second ripple counter to reset, and signal lights indicating energization of said clock signal generator and external power switch.

7. An apparatus according to claim 1 in which said signal conditioner first circuit means comprises a power supply circuit adapted for connection to a source of electric power, a transformer, a rectifier, and a capacitor, a multivibrator comprising a pair of NOR gates connected in circuit with said probe assembly, an isolator/test circuit including an AND gate connected to receive the output from said multivibrator, said signal conditioner being operable to energize said probe assembly on contact of said probe element with said shaft, and to transmit an intermittent signal to said monitor, said monitor comprises switch means connected to switch external power between off and on, a digital counter connected to count the time since first contact was detected and to indicate the time left before shutdown, said alarm means including optical signal means indicating intermittent contact by said shaft and said probe element, signal means indicating predetermined excessive contact by said shaft and said probe element, and counting means for distinguishing intermittent signals from said probe assembly from predetermined excessive signals and operable to energize said optical signal means on occurrence of said intermittent signals and to energize said last named signal means on occurrence of said predetermined excessive signals.

8. An apparatus according to claim 7 in which said counting means comprises a clock signal generator, first and second ripple counters connected to receive the output from said clock signal generator, programmable coincidence gates associated with said first and said second ripple counters to compare the counts, said second ripple counter being connected to receive signals from said probe assembly and signal conditioner causing said second ripple counter to reset, and further including a test circuit interconnecting said first named and second named signal means and said signal conditioner and having a switch operable to initiate a test sequence for verifying that the apparatus is operative, and switch means associated with said optical signal means to acknowledge an unsafe condition and shut down operation of said shaft and to reset the monitor for further operation.

9. An apparatus according to claim 1 including an insulated bushing for installation on said housing and having an internally threaded opening for receiving and supporting said probe element at said intermediate threaded portion thereof.

10. An apparatus according to claim 1 in which said signal conditioner first circuit means comprises a power supply circuit adapted for connection to a source of electric power, a transformer, a rectifier, and a capacitor, a multivibrator comprising a pair of NOR gates connected in circuit with said probe assembly, an isolator/test circuit including an AND gate connected to receive the output from said multivibrator, and said signal conditioner being operable to energize said probe assembly on contact of said probe element with said shaft, and to transmit an intermittent signal to said monitor.

11. An apparatus according to claim 1 in which said signal conditioner first circuit means comprises a power supply circuit adapted for connection to a source of electric power, a transformer, a rectifier, and a capacitor, a multivibrator comprising a pair of NOR gates connected in circuit with said probe assembly, an isolator/test circuit including an AND gate, connected to receive the output from said multivibrator, and said signal conditioner being operable to energize said probe assembly on contact of said probe element with said shaft, and to transmit an intermittent signal to said monitor.

12. An apparatus according to claim 1 including an insulated bushing for installation on said housing and having an internally threaded opening for receiving and supporting said probe element at said intermediate threaded portion thereof.

13. A probe assembly for monitoring a rotating shaft having a supporting housing, said probe assembly comprises a probe element having an elongated body of electrically conductive metal having an enlarged outer end, an intermediate portion of reduced diameter threaded for support on said shaft housing, and a smaller inner end portion having an end recess, a probe member slidably positioned in said end recess, a cap member closing the end of said recess and securing said probe member therein, a spring member positioned in said recess urging said probe member against said cap member with the end portion protruding outward therefrom, and said probe member end portion being adapted to make electrical contact with said shaft on excessive vibration of said shaft.

14. A probe assembly according to claim 13 including an insulated bushing for installation on said housing and having an internally threaded opening for receiving and supporting said probe element at said intermediate threaded portion thereof.

15. A remote viewing monitor for a vibration monitoring apparatus having a vibration detecting probe assembly mounted adjacent to a rotating shaft, comprising switch means connected to switch external power between off and on, a digital counter connected to count the time since first contact was detected and to indicate the time left before shutdown, optical signal means indicating intermittent contact by said shaft and said probe assembly, signal mens indicating predetermined excessive contact by said shaft and said probe assembly, and counting means for distinguishing intermittent signals from said probe from predetermined excessive signals and operable to energize said optical signal means on occurrence of said intermittent signals and to energize said last named signal means on occurrence of said predetermined excessive signals.

16. A monitor according to claim 15 in which said counting means comprises a clock signal generator, first and second ripple counters connected to receive the output from said clock signal generator, programmable coincidence gates associated with said first and said second ripple counters to compare the counts, and said second ripple counter being connected to receive signals from said probe assembly and adapted to be connected to a signal conditioner causing said second ripple counter to reset.

17. A monitor according to claim 16 including a test circuit interconnecting said first named and second named signal means and said probe and having a switch operable to initiate a test sequence for verifying that the apparatus is operative.

18. A monitor according to claim 15 including switch means associated with said optical signal means to acknowledge an unsafe condition and shut down operation of said shaft and to reset the monitor for further operation.

19. A monitor according to claim 15 in which switch means associated with said optical signal means to acknowledge an unsafe condition and shut down operation of said shaft and to reset the monitor for further operation.

said counting means comprises a clock signal generator, first and second ripple counters connected to receive the output from said clock signal generator, programmable coincidence gates associated with said first and said second ripple counters to compare the counts, said second ripple counter being connected to receive signals from said probe assembly and adapted to be connected to a signal conditioner causing said second ripple counter to reset, and signal lights indicating energization of said clock signal generator and external power switch.

* * * * *